United States Patent [19]

Kanda et al.

[11] Patent Number: 5,036,904
[45] Date of Patent: Aug. 6, 1991

[54] LATENT HEAT STORAGE TANK

[75] Inventors: Tetsuo Kanda; Yuichiro Hara; Kazuma Kawano, all of Yokohama; Eiji Kawata, Chigasaki; Kenichi Okuda, Fujisawa, all of Japan

[73] Assignee: Chiyoda Corporation, Yokohama, Japan

[21] Appl. No.: 566,759

[22] Filed: Aug. 14, 1990

[30] Foreign Application Priority Data

Dec. 4, 1989 [JP] Japan .................................. 1-313434
Jul. 13, 1990 [JP] Japan .................................. 2-184073

[51] Int. Cl.⁵ ........................ F28D 20/00; F25D 3/00; F25D 17/02
[52] U.S. Cl. ........................................ 165/10; 62/430; 62/434; 62/59; 165/46; 165/104.11
[58] Field of Search ...................... 165/10, 47, 104.11, 165/46; 62/430, 434, 59

[56] References Cited

U.S. PATENT DOCUMENTS

| 4,011,736 | 3/1977 | Harrison | 165/10 |
| 4,346,569 | 8/1982 | Yuan | 165/10 |
| 4,827,735 | 5/1989 | Foley | 62/430 |

FOREIGN PATENT DOCUMENTS 41747 2/1988 Japan ...................................... 165/10

Primary Examiner—Albert W. Davis, Jr.
Attorney, Agent, or Firm—Oblon, Spivak, McClelland, Maier & Neustadt

[57] ABSTRACT

A latent heat storage tank is filled with antifreeze solution such as ethylene glycol, propylene glycol, calcium chloride and a plurality of bundles of cylindrical latent heat containers in the form of tubes or pipes which float perpendicularly to the antifreeze surface. The antifreeze solution is circulated by a refrigerator provided outside the latent heat storage tank. Each cylindrical latent heat container contains water or other liquid which is cooled to become ice by said antifreeze solution which has been cooled by said refrigerator driven by inexpensive night time electric power.

5 Claims, 3 Drawing Sheets

LATENT HEAT STORAGE TANK

BACKGROUND OF THE INVENTION (A) Technical Field

The present invention relates to a latent heat storage tank of a latent heat system wherein a refrigerator is operated using inexpensive night time electric power whereby heat is stored as latent heat in the state of ice or icy liquid by refrigerating the water or liquid enclosed in latent heat containers surrounded with an antifreeze solution cooled by said refrigerator and then using the latent heat for air-conditioning during the day when said ice or icy liquid melts.

(b) Statement of the Prior Art

The following examples are conventionally known as latent heat storage tanks using inexpensive night time electric power.

(1) A latent heat storage tank which is provided with an ice-maker and filled with a circulating anti-freeze solution cooled by a refrigerator to make ice in said ice-maker, for example, disclosed in Japanese Patent Laid-open Publication No. 59-38535.

(2) A latent heat storage tank which contains spherical capsules composed of rigid synthetic resin containing water or solution. And said tank is filled with antifreeze solution. The water or solution in the capsules is cooled by said antifreeze solution by said refrigerator and stores latent heat in the state of ice or icy liquid within said capsules.

(3) A latent heat storage tank having containers made of an expansible heat conductive material positioned with a predetermined distance from each other in which latent heat is stored by refrigerating the water in said containers by antifreeze solution cooled by a refrigerator, for example, disclosed in Japanese Patent Laid-open Publication No. 63-19126.

According to said conventional art (1) the materials used in the ice-maker must be strong because the antifreeze solution is circulated within said ice-maker and the thickness of said ice-maker must be great enough to withstand the internal pressure caused by the antifreeze solution. If a small part of said ice-maker would be bent or blocked, then the antifreeze solution will not flow, and consequently, the material used for the ice-maker should be sufficiently rigid and thick. In addition, the ice which forms on the surface of the ice-maker lowers heat conductivity and thereby reduces efficiency.

In the case mentioned above in (2), the anti-freeze solution is circulated outside the capsules. If the capsules are soft, they will be deformed due to the force of gravity and their own buoyancy, causing the spaces between the capsules to be blocked and disrupting the even flow of the antifreeze solution. Since the deformation of the capsules can not be allowed, the capsules should be made of a rigid materials and their thickness should be increased even though this results in a decreased rate of heat transfer.

According to the point (3) above, the cost of the production is high and it is necessary to restructure the tank body when using a tank of conventional type, because the containers made of an expansible heat conductive material must be hung or fixed to the tank body.

SUMMARY OF THE INVENTION

An object of the invention is to present an inexpensive latent heat storage tank of good heat conductivity which is applicable as a conventional latent heat storage tank without any restructuring.

It is a general object of the invention to provide a latent heat storage tank comprising therein bundles of a plurality of latent heat containers, cylindrical floaters, balancing weights and bundling means, said tank being filled with antifreeze solution which is cooled and circulated through the tank by a refrigerator, each said latent heat container being made of flexible tube which contains such an amount of water as to leave a flat space in the top portion thereof, said weights being provided at the bottom of the container or lower portions around the bundle of the latent heat containers, said cylindrical floaters floating substantially perpendicularly with their top portions projecting above the liquid surface of the antifreeze solution due to the effects of said floaters and weights.

It is another object of the invention to provide a latent heat storage tank comprising a plurality of latent heat containers within said tank filled with antifreeze solution, each latent heat container being made of a pipe closed at both ends and containing therein such an amount of water as to leave a space at the top portion as well as weights at the lower portion, floating substantially perpendicularly with its top portion projecting above the liquid level of said antifreeze solution.

According to the invention, each latent heat container or each bundle of latent heat containers floats or stands at the bottom of a tank body substantially perpendicularly with its top portion projecting above the liquid level of antifreeze solution due to the buoyancy of a cylindrical floater or due to the top space of said latent heat container and balancing weight.

Because the buoyancy or gravity of the latent heat containers is able to keep them standing or floating perpendicularly. They will not crush to each other or the passages between them, so the circulation of the antifreeze solution is safely maintained. The expansion volume of water due to freezing in each latent heat container is contained within the top flat portion thereof or by the rise in the water level in the top space of each latent heat container. The air pressure in the space does not increase when the water level in the space rises owing to the hole opened in the top portion. The maintenance of free passages for the circulation of antifreeze solution is much easier if spacers are provided outside each latent heat container or each bundle of latent heat containers. A net is used as a means of bundling the latent heat containers, and is convenient for transporting the containers. Balancing weights can be provided outside the latent heat containers. Granular solid particles may be mixed with water as balancing weights which also act as an antisupercooling agent.

It is a further object of the invention to provide any liquid of which has a freezing temperature higher than 0° C. instead of water, because such a liquid can raise the temperature of the antifreeze solution and improve the efficiency of the refrigerator.

DESCRIPTION OF SOME PREFERRED EMBODIMENTS

The embodiment of the present invention will be described hereinafter according to the attached drawings.

Figure 1:
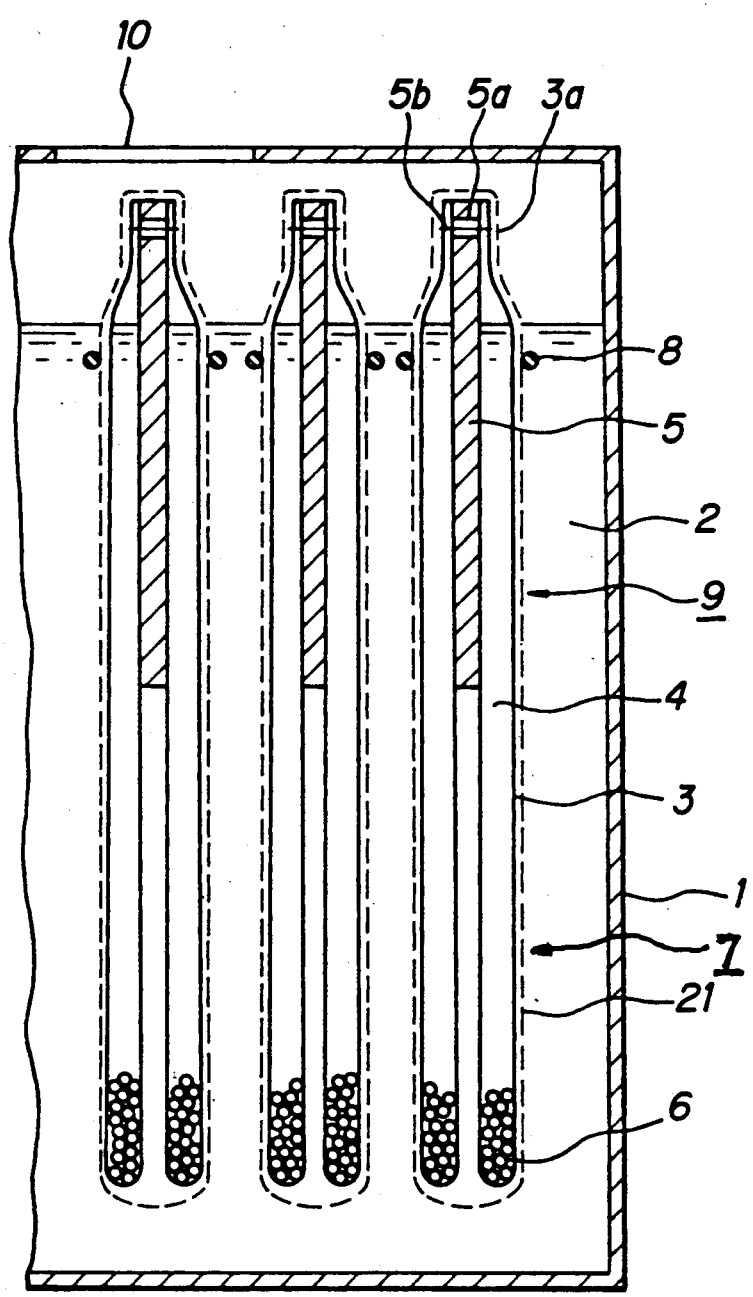
FIG. 1 shows a sectional view of a part of the first embodiment according to the invention.

As is shown in FIG. 1, a tank 1 having a manhole 10 in its top wall is filled with antifreeze solution 2 composed of, for example, ethylene glycol, propylene glycol, calcium chloride with a space left in the upper portion of the tank. A plurality of bundles 7 of latent heat containers 3 are put into the tank and the bundles float substantially perpendicularly.

A flexible tube 3 of synthetic resin such as polyethylene or polypropylene polymerized at high pressure is closed at the bottom end, and filled with a predetermined amount of water. Granular weights 6 are brought down into the tube and said flexible tube is then closed near the top portion with a heat seal or similar means. The water 4 enclosed in the tube 3 is adjusted so that a flat portion 3a will be formed at the top portion of each tube 3. The flexible tube 3 mentioned above is an embodiment of the latent heat container according to the invention.

A hole is located at above a sealed part of flat space of said soft tube and a plurality of soft tubes 3 are fixed to the floater 5 by means of a string 5b through said hole 5a which is opened in the top portion of the cylindrical floater 5 made of a cylindrical rod, a hollow cylinder or other form that provides buoyancy in the antifreeze solution. The fastening means is not restricted to the string 5b, and other known fastening means such as a clamping ring or a screw may be used.

Moreover, the granular weights 6 brought down in each flexible tube are adjusted so that the flat portion 3a of said soft tubes 3 may project above the liquid level of the antifreeze solution 2 in the tank 1 when the bundles of flexible tubes 3 float in the antifreeze solution 2 in the tank body 1.

A net 21 made of an anticorrosion material covers a plurality of soft tubes 3 and forms a bundle of flexible tubes.

Annular spacers 8 engaged with the bundles 9 of flexible tubes 3 will maintain the space among the bundles 9 of flexible tubes 3.

In this embodiment, the flexible tubes 3 are made of a synthetic resin such as polyethylene or polypropylene which is neither soluble nor expansible in said antifreeze solution, their length is about 2 m, their thickness is 0.1–0.2 mm and their diameter is 20–30 mm. About 30–100 g of sand or clay per soft tube 3 is used for weight 6 as well as for anti-overcooling agent. Six of flexible tubes 3 are connected to each floater 5.

Excluding the flexible tube 3 itself, 90% of the volume of each soft tube 3 is city water and 10% of it is left empty to form a top flat portion 3a.

In said embodiment, a bundle of flexible tubes 3 is provided with a net 21 and an annular spacer 8, though they are not always required. The tank 1 may be a open type without a ceiling.

For a floater 5, a pipe made of synthetic resin with both ends closed, a coated cylinder made of foamed polystyrene or a cylinder made of foamed polystyrene covered with a soft tube can be used.

Figure 2:
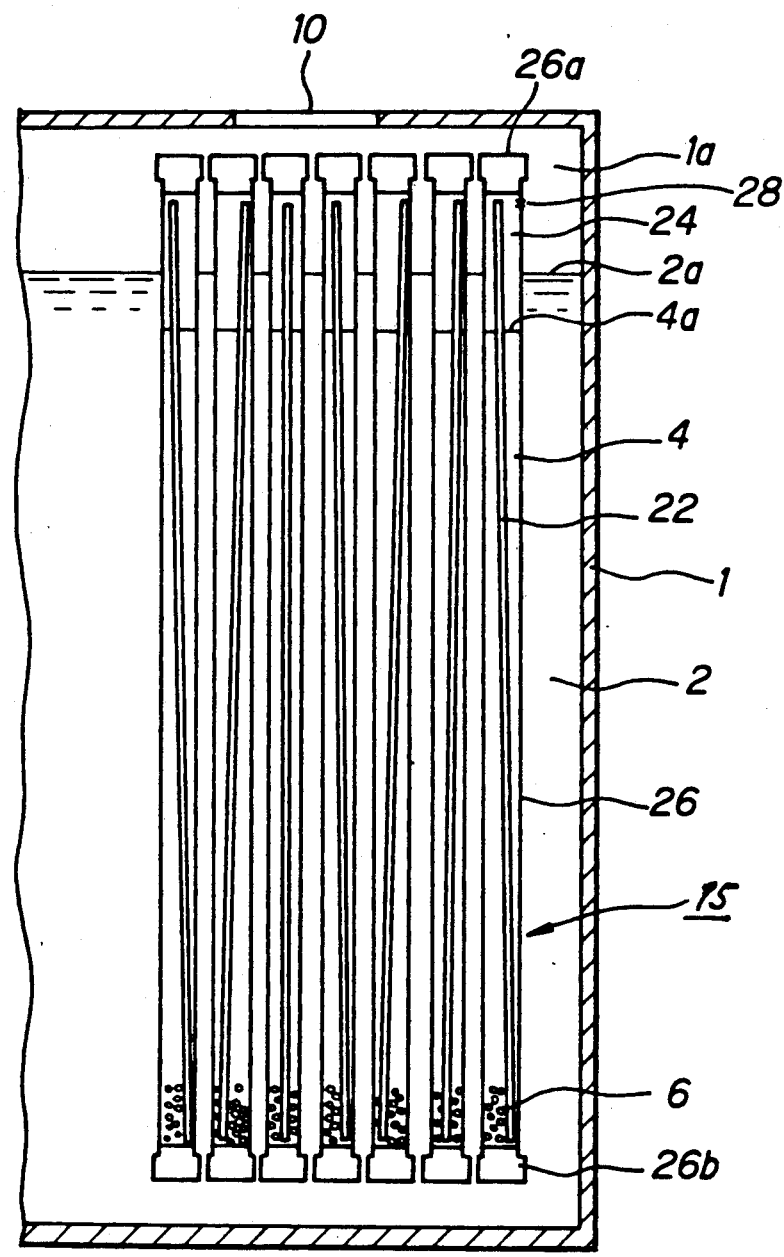
FIG. 2 shows a similar view of the second embodiment.

In FIG. 2, another embodiment, i.e. the second embodiment, is shown whereby said latent heat container 15 is made of a pipe 26 which is made of materials such as polyethylene, polypropylene, aluminium, or stainless steel and which encloses therein weights such as sand or clay, and water and the required empty space. Both ends of the pipe 26 are closed with a plug 26a and a plug 26b and the length of which is approximately the same as the height of tank 1. In this embodiment, a thin rod 22 made of a material such as vinyl chloride is enclosed from bottom to top in the pipe 26. The diameter of the rod 22 is about 2 mm. A hole 28 whose diameter is about 0.1 mm –0.5 mm is provided near the top portion of the pipe whereby the space portion 24 and the top space portion 1a of said tank 1 can communicate with each other. The hole 28 may be provided in any desired portion of the upper plug 26a, or in the top portion of the pipe 26.

In this embodiment, sand or clay is used as a balancing weight 6 for said pipe 26 and particles of the sand and clay act also as an anti-overcooling agent for the water 4 enclosed in the pipe 26. Said thin rod 22 will act as additional means for anti-overcooling if said particles of the sand or clay act insufficiently.

Both ends of the pipe are open in the embodiment shown in FIG. 2; however, pipes originally closed at the bottom end may be used.

Figure 3:
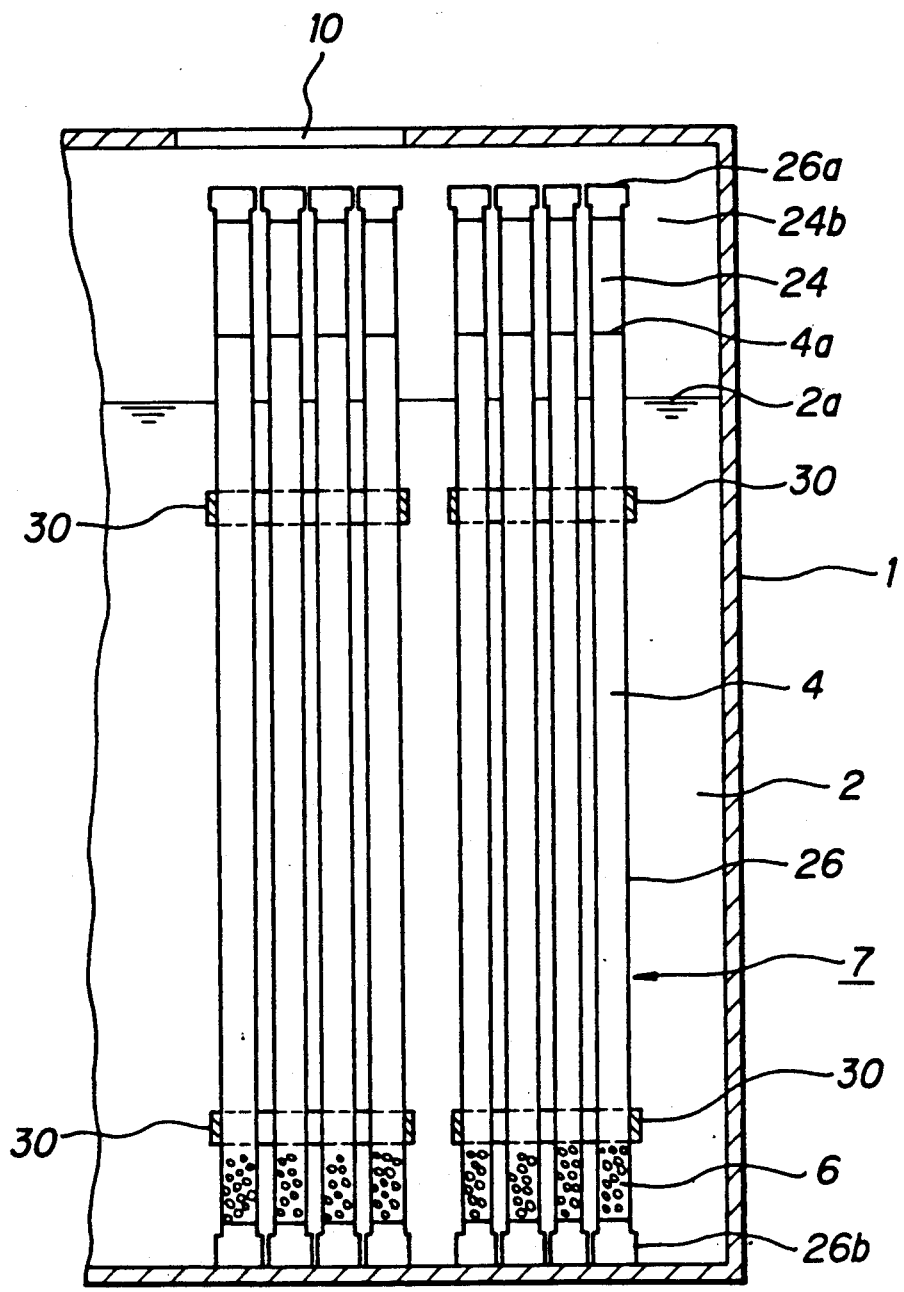
FIG. 3 shows a similar view of the third embodiment.

The third embodiment shown in FIG. 3 will now be described. In the tank 1 filled with antifreeze solution 2, a plurality of bundles 7 of a plurality of pipes 26 bundled with a band 30 is provided. Each bundle 7 of pipes 26 stands at the bottom of the tank 1 substantially perpendicularly with the top portion projecting above the level of the antifreeze solution 2. Said pipes 26 lacks the thin rod 22 and a hole 28 in the second embodiment, but it is possible to provide them. Moreover, it is possible to place bundles of pipes 26 at the the bottom of said tank 1 in advance and then fill the tank with the antifreeze solution because said bundles of pipes 26 can stand independently without the antifreeze solution 2.

ADVANTAGES OF THE INVENTION

The present invention has been explained hithertofore and has the following advantages.

The forms of the latent heat containers can be maintained without deformation due to gravity, and the steady flow of the antifreeze solution is maintained by floating the latent heat containers substantially perpendicularly using buoyancy. Therefore, it is not necessary to provide latent heat containers having any particular rigidity, and it is also not necessary to provide any supports to hang the latent heat containers. Thus, an inexpensive latent heat storage tank of simple construction is possible and conventional tanks can be used without any restructuring.

What is claimed is:

1. A latent heat storage tank comprising therein bundles of a plurality of latent heat containers, cylindrical floaters, balancing weights and bundling means, said tank being filled with antifreeze solution which is cooled and circulated through the tank by a refrigerator, each said latent heat container being made of a flexible tube which contains such an amount of water as to leave a flat space in the top portion thereof, said weights being provided at the bottom of the container or lower portions around the bundle of the latent heat containers, said cylindrical floaters floating substantially perpendicularly with their top portions projecting above the surface of the antifreeze solution due to the effect of said floaters and weights.

2. A latent heat storage tank according to claim 1, wherein said water includes particles in order to prevent the water from overcooling as well as to serve as balancing weights.

3. A latent heat storage tank according to claim 1, which includes liquid instead of water, the solidifying point of said liquid being higher than 0° C.

4. A latent heat storage tank according to claim 1, wherein each bundle of latent heat containers is provided with an annular spacer.

5. A latent heat storage tank according to claim 1 wherein a plurality of flexible tubes are covered with a net for each bundle of latent heat containers.

* * * * *